United States Patent
Kato et al.

(10) Patent No.: US 10,281,805 B2
(45) Date of Patent: May 7, 2019

(54) IMAGE DISPLAY DEVICE AND IMAGE DISPLAY METHOD

(71) Applicant: NEC Display Solutions, Ltd., Tokyo (JP)

(72) Inventors: Atsushi Kato, Tokyo (JP); Tomohiro Nakagawa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 17 days.

(21) Appl. No.: 15/743,620

(22) PCT Filed: Jul. 17, 2015

(86) PCT No.: PCT/JP2015/070529
§ 371 (c)(1),
(2) Date: Jan. 10, 2018

(87) PCT Pub. No.: WO2017/013706
PCT Pub. Date: Jan. 26, 2017

(65) Prior Publication Data
US 2018/0196335 A1    Jul. 12, 2018

(51) Int. Cl.
*G03B 21/00* (2006.01)
*G09G 3/20* (2006.01)
(Continued)

(52) U.S. Cl.
CPC .......... *G03B 21/008* (2013.01); *G03B 21/00* (2013.01); *G09G 3/20* (2013.01); *G09G 3/2037* (2013.01);
(Continued)

(58) Field of Classification Search
CPC .................................................. G03B 21/204
See application file for complete search history.

(56) References Cited

U.S. PATENT DOCUMENTS 5,905,545 A * 5/1999 Poradish .............. H04N 9/3108
348/743
2006/0279710 A1* 12/2006 Tani ..................... H04N 5/7458
353/85

FOREIGN PATENT DOCUMENTS

JP    2000-066637 A    3/2000
JP    2002-278501 A    9/2002
(Continued)

OTHER PUBLICATIONS

International Search Report (ISR) (PCT Form PCT/ISA/210), in PCT/JP2015/070529, dated Oct. 13, 2015.
(Continued)

*Primary Examiner* — Cara A Rakowski
*Assistant Examiner* — Danell L Owens
(74) *Attorney, Agent, or Firm* — McGinn IP Law Group, PLLC.

(57) ABSTRACT

An image display device includes: a light source unit that sequentially supplies light of a plurality of colors; an image formation unit that is provided with a pixel region that is made up of a plurality of pixels, light of a plurality of colors supplied by the light source unit sequentially irradiating the pixel region, and images of a plurality of colors being sequentially formed by the modulation of the incident light by each of the pixels; and a controller that controls the image-forming operation of the image formation unit. The controller causes formation of images of at least one color among the plurality of colors with pixel combinations made up of a plurality of pixels as pixel units and individually controls each pixel that make up the pixel combinations.

17 Claims, 15 Drawing Sheets

(51) Int. Cl.
*G09G 3/34* (2006.01)
*H04N 5/74* (2006.01)

(52) U.S. Cl.
CPC ............... *G09G 3/34* (2013.01); *H04N 5/74* (2013.01); *G09G 2310/0235* (2013.01)

(56) References Cited

FOREIGN PATENT DOCUMENTS

| | | |
|---|---|---|
| JP | 2003-102030 A | 4/2003 |
| JP | 2006-058588 A | 3/2006 |
| JP | 2006-215534 A | 8/2006 |
| JP | 2007-011215 A | 1/2007 |
| JP | 2010-122493 A | 6/2010 |
| JP | 2010-224493 A | 10/2010 |
| JP | 2014-021223 A | 2/2014 |

OTHER PUBLICATIONS

"Digital Micromirror Display", Journal of the Vacuum Society of Japan, vol. 43, No. 2, 2000.

* cited by examiner

[Fig. 1]
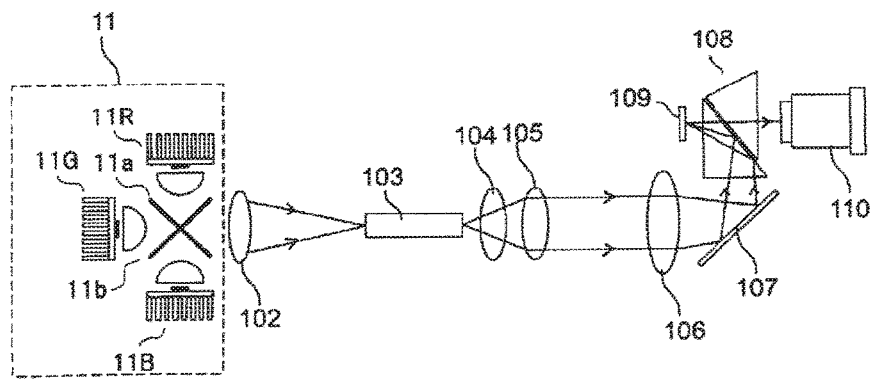

[Fig. 2]
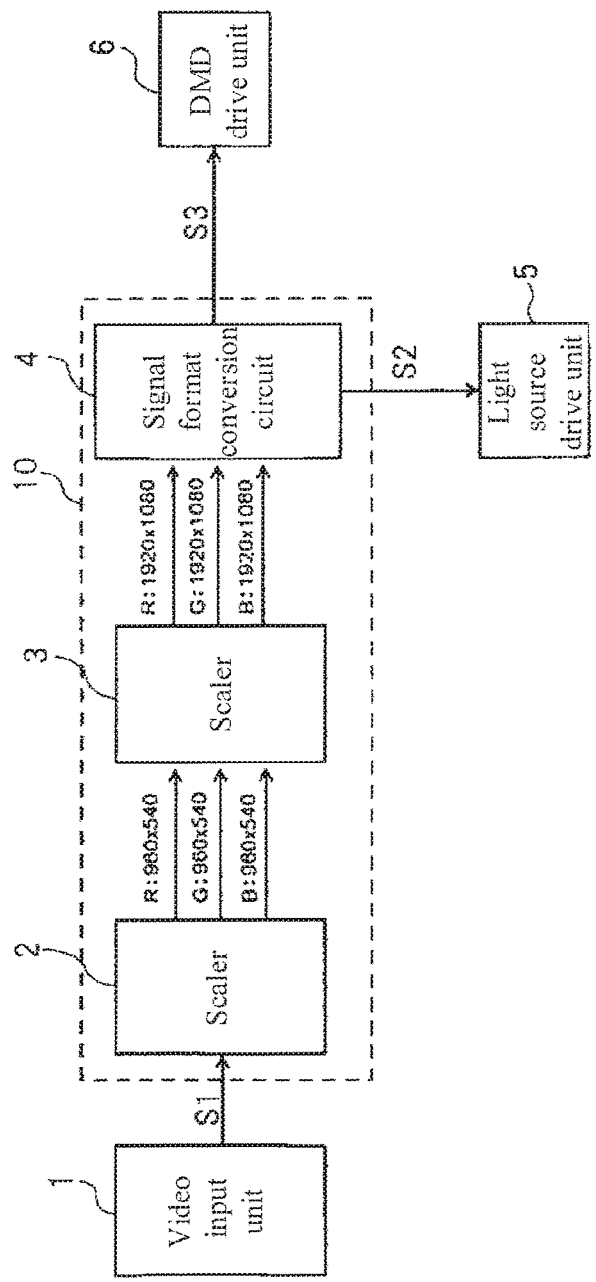

[Fig. 3A]
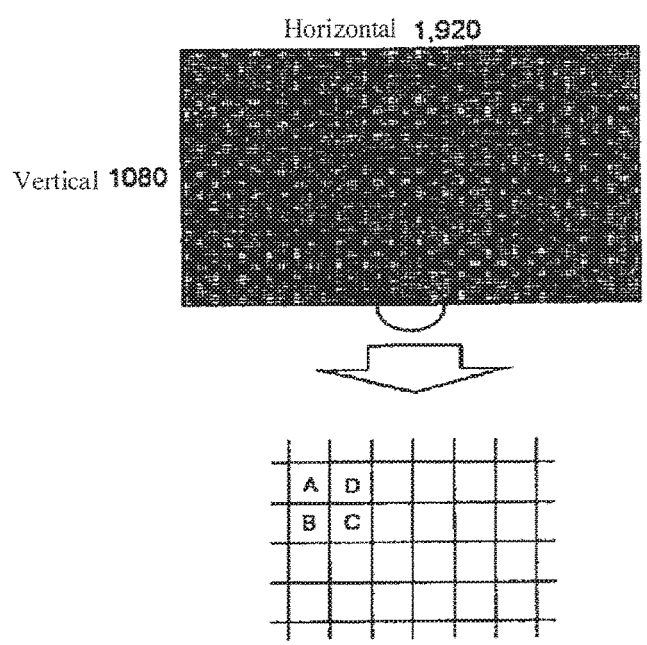

[Fig. 3B]
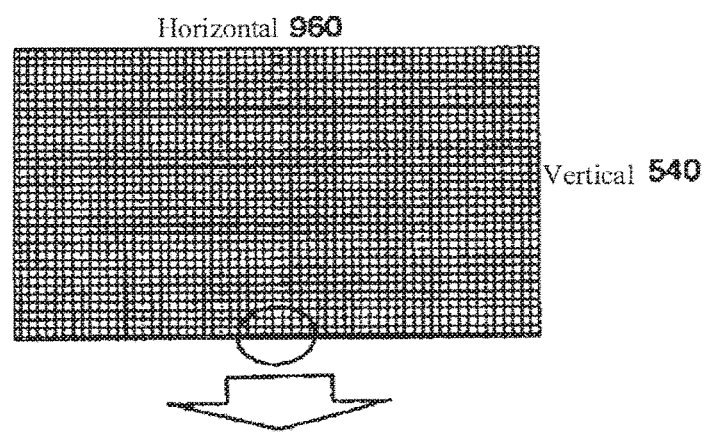
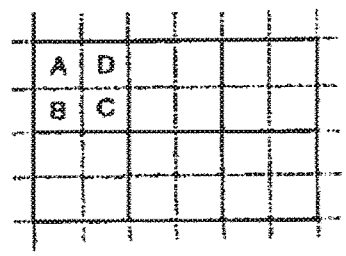

[Fig. 4]
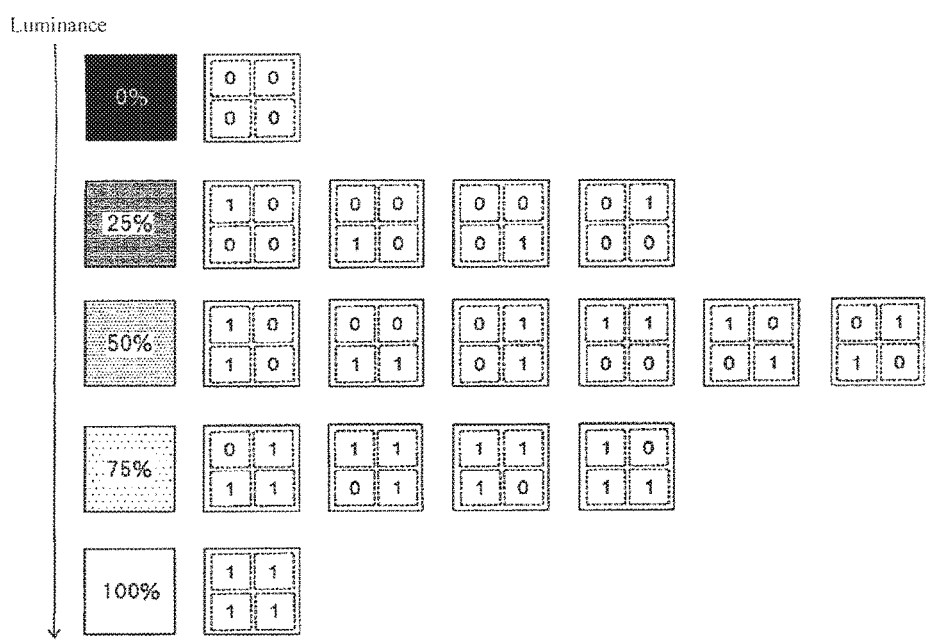

[Fig. 5]
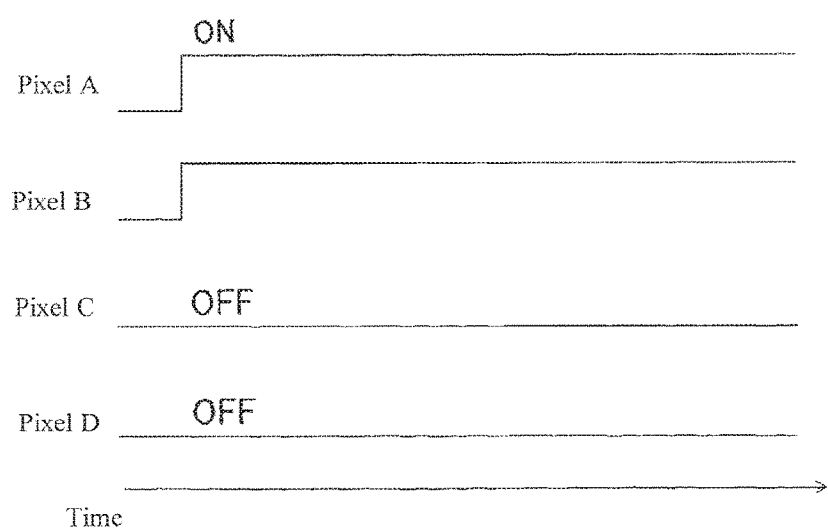

[Fig. 6]
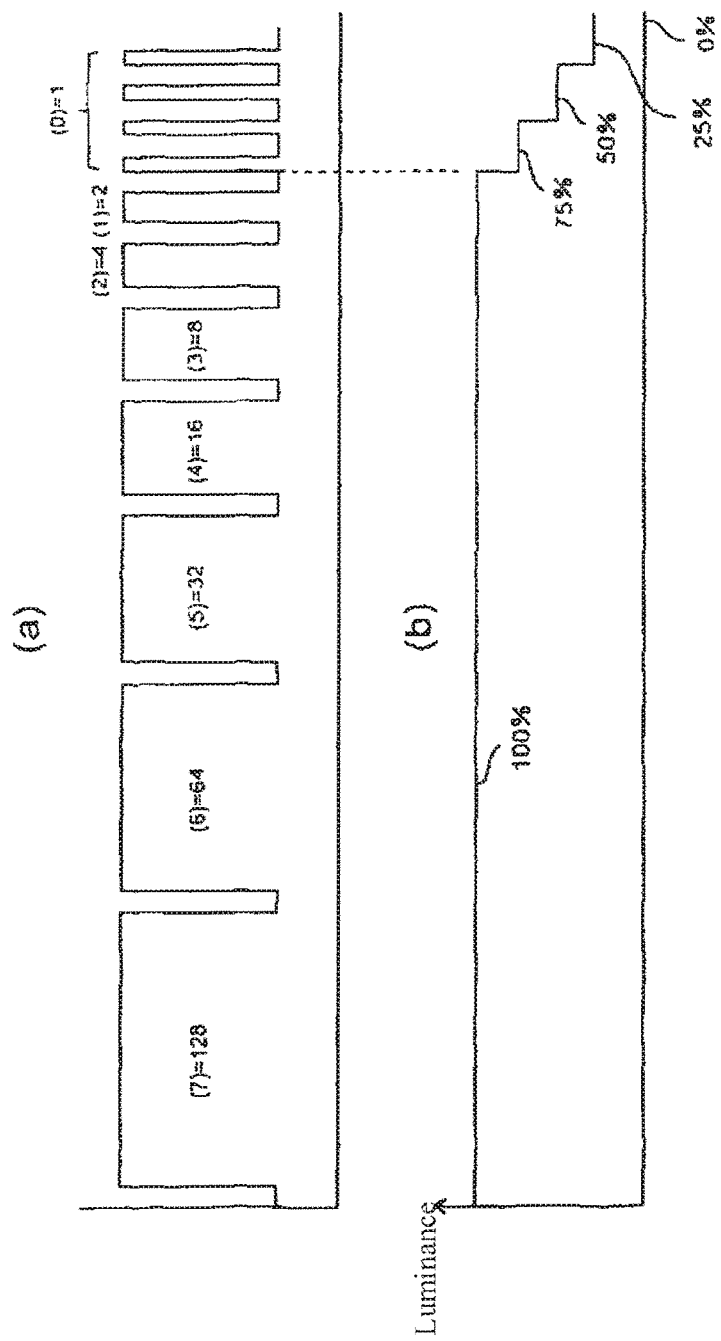

[Fig. 7]
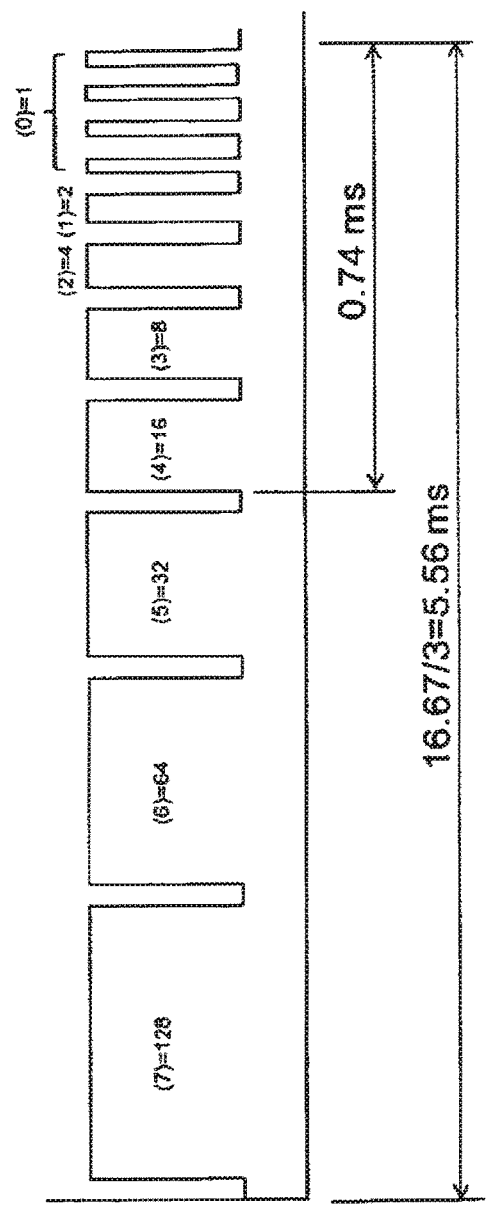

[Fig. 8]
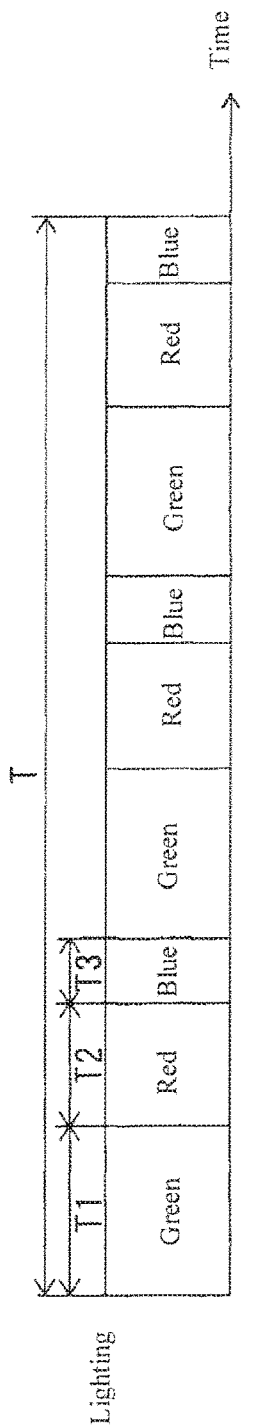

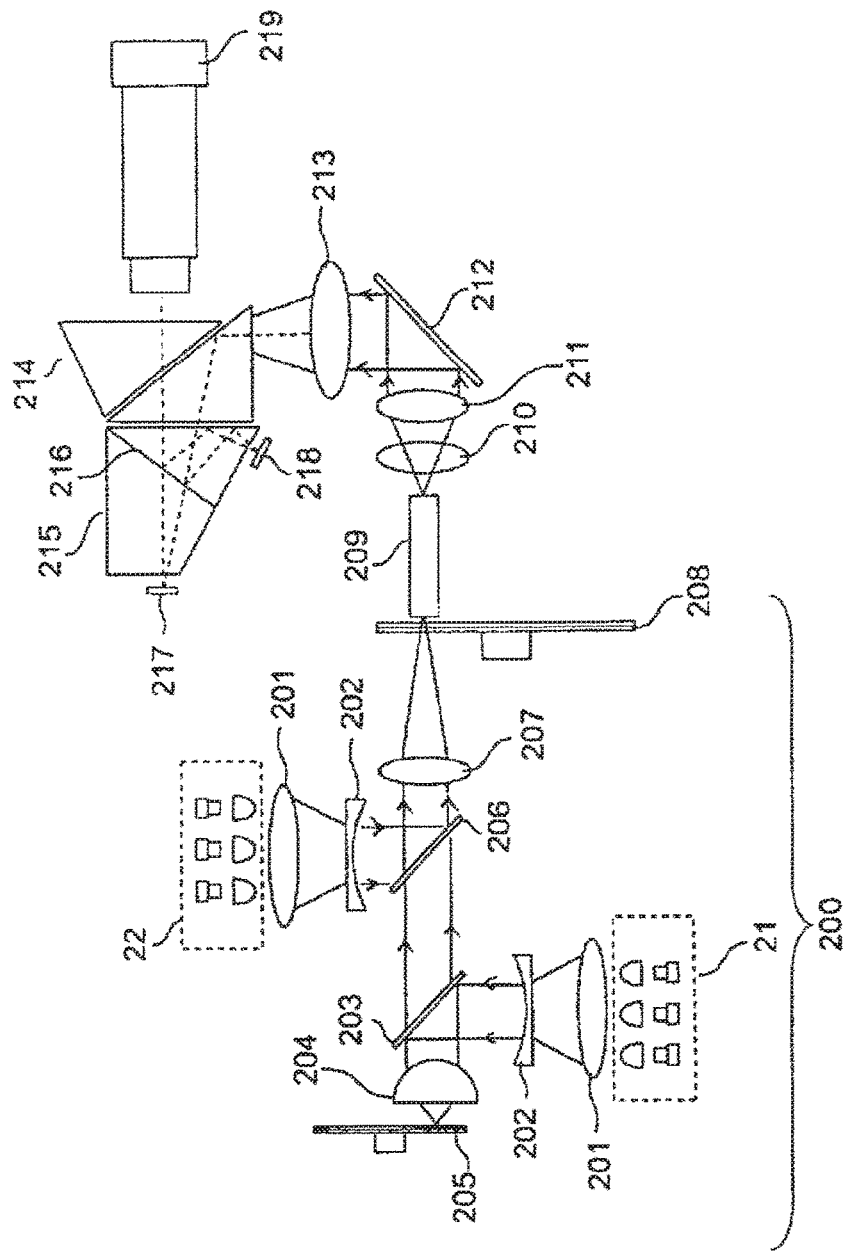
[Fig. 9]

[Fig. 10A]
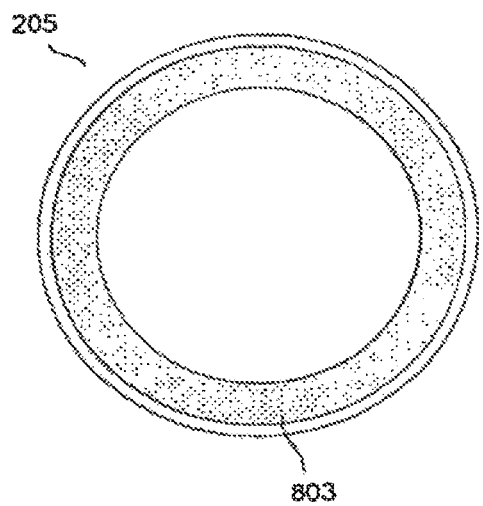
[Fig. 10B]
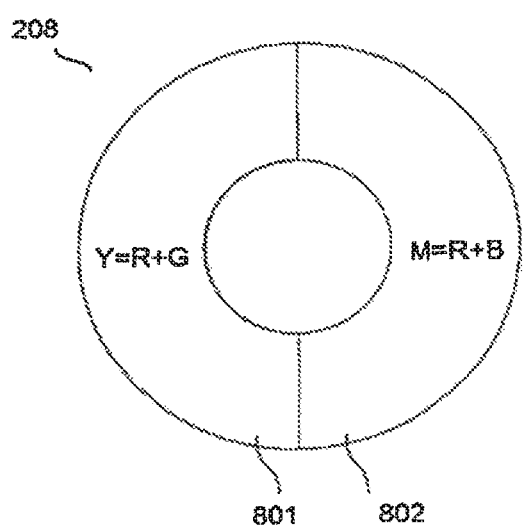

[Fig. 11]
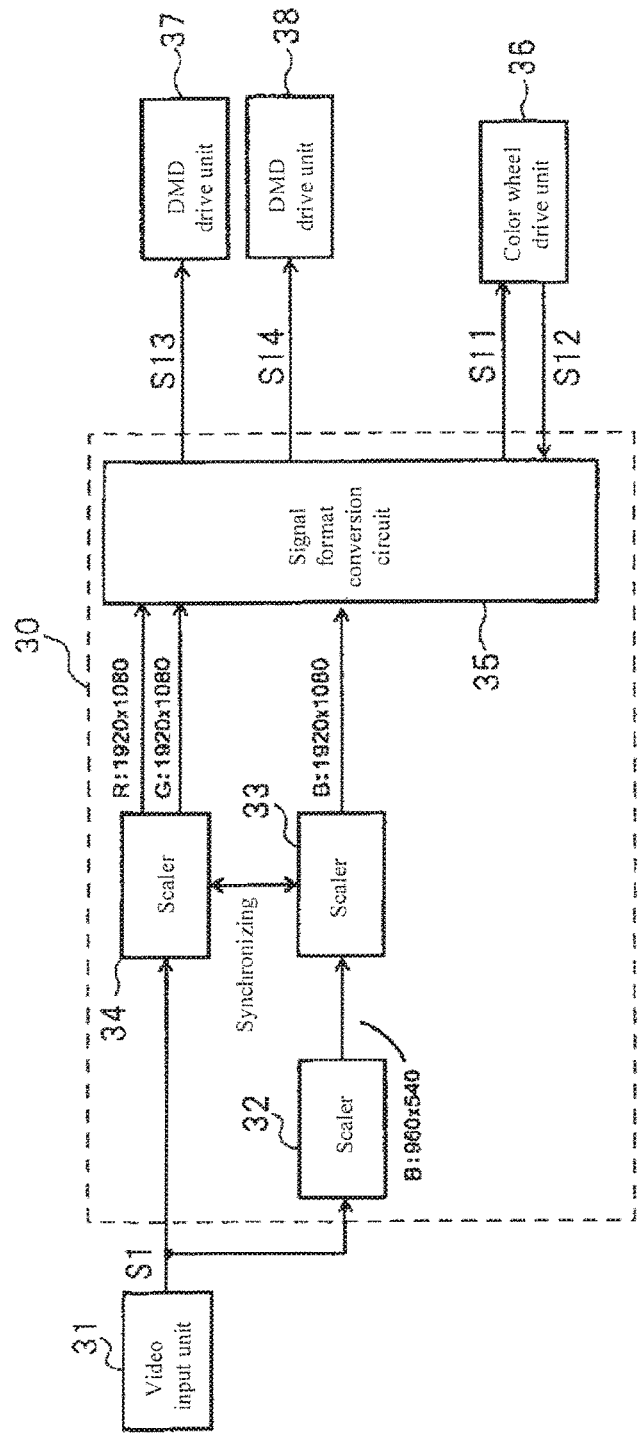

[Fig. 12]
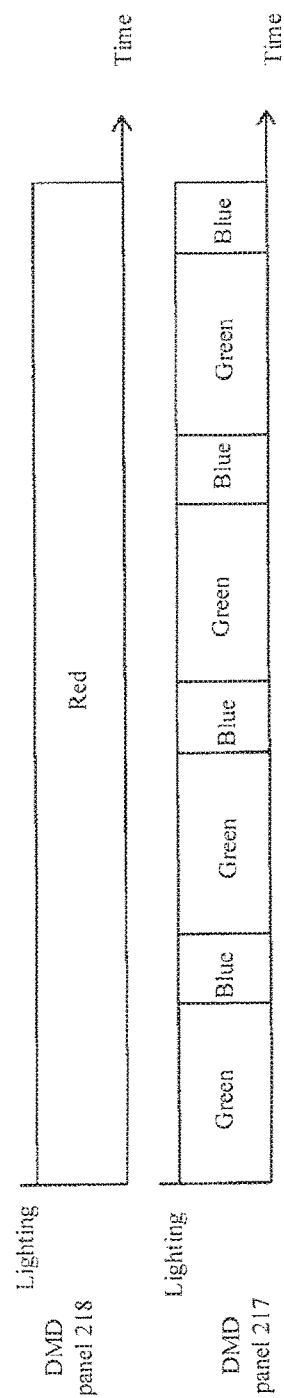

[Fig. 13A]
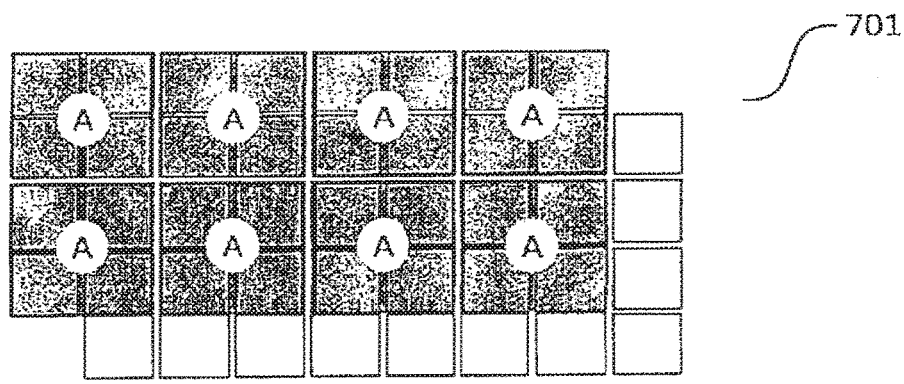
[Fig. 13B]
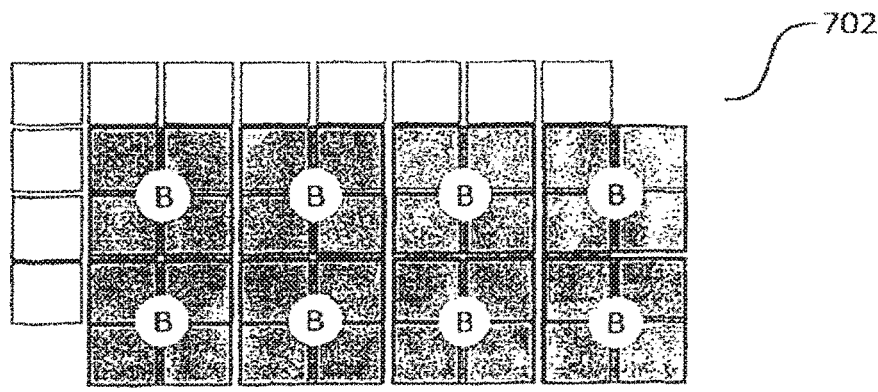

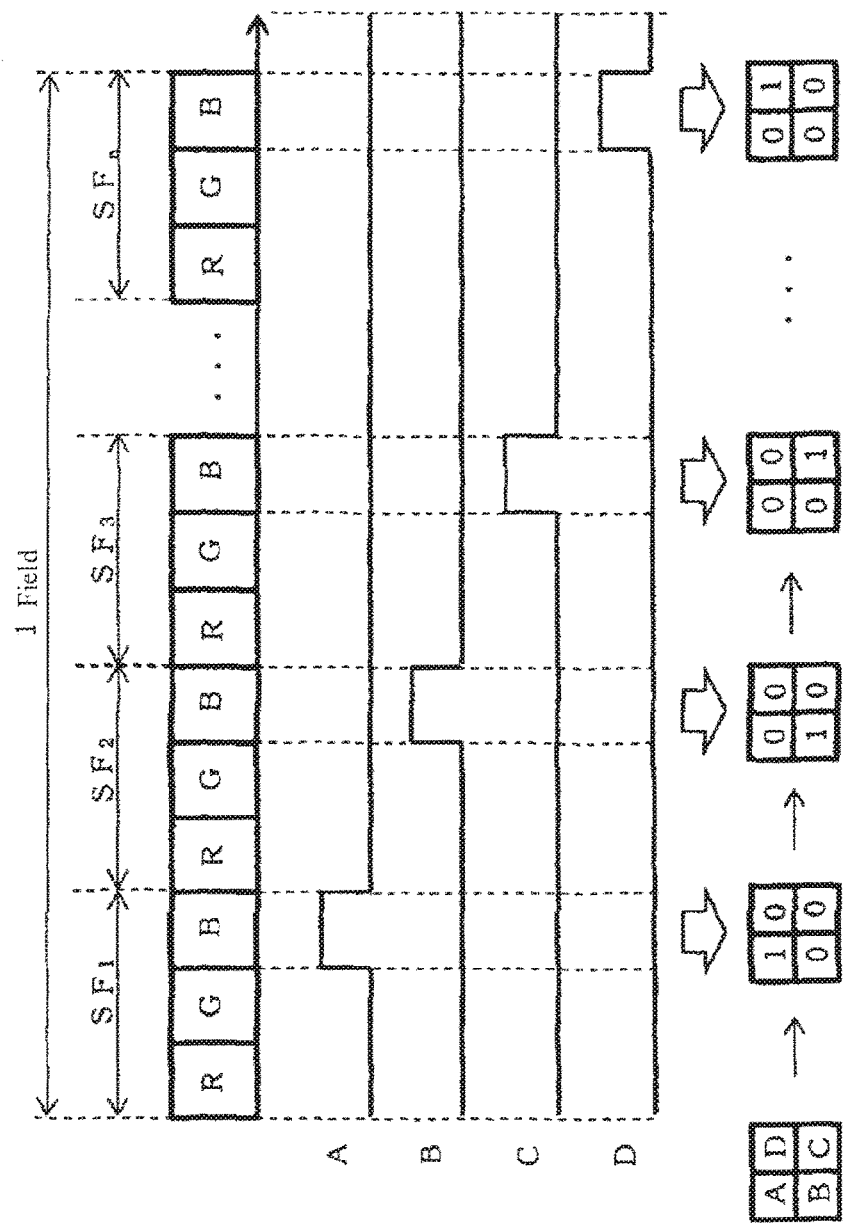
[Fig. 14]

IMAGE DISPLAY DEVICE AND IMAGE DISPLAY METHOD

TECHNICAL FIELD

The present invention relates to a field sequential color image display device and an image display method that obtains color images by sequentially displaying images of a plurality of colors.

BACKGROUND ART

A single-panel projector (see Patent Document 1) is one example of a field sequential color image display device. Such a single-panel projector has a light source, a color wheel, a digital mirror device (DMD), and a projection optical system.

The color wheel has a wheel unit that is provided with a red filter region, a green filter region, and a blue filter region, and is configured such that by rotating this wheel, white light from the light source sequentially irradiates each color filter region to sequentially emit red (R) light, green (G) light, and blue (B) light. The light (RGB) emitted by this color wheel is irradiated upon the DMD.

The DMD has a plurality of micromirrors, each micromirror forming a pixel. The micromirrors are configured such that the angle of each changes in accordance with the drive voltage, the reflection angle differing when a drive voltage that indicates the ON state is supplied and when a drive voltage that indicates the OFF state is supplied. The incident luminous flux is spatially modulated to form an image by the ON/OFF control of each micromirror in accordance with a video signal.

The image-forming operation of the DMD is carried out in synchronization with the rotation operation of the color wheel. The DMD sequentially forms red images, green images, and blue images on the basis of image frames that correspond to each of the colors of red, green and blue. The projection optical system enlarges and projects upon a screen the red images, green images, and blue images that are formed by the DMD.

The frame interval of a single image frame is normally ⅟60 second. The color wheel makes one rotation with each image frame (3600 rpm). There are six color subframes during each frame frequency interval, these each being red, green, blue, red, green, and blue. Color-separated light is sequentially irradiated into the DMD according to these six color subframes. On the screen, a red image, green image, blue image, red image, green image, and blue image are sequentially displayed in the interval of ⅟60 second, and a full-color image is perceived by the superposition of the afterimages of these images.

In a field sequential color image display device as described above, a phenomenon referred to as color breaking is known to occur. This color breaking phenomenon is a phenomenon in which afterimages of each of the colors red, green, and blue are not properly superposed when a picture of a moving object is displayed, and a red or green tinge is therefore seen to trail after the moving object.

Typically, by increasing the switching speed of the light source color, i.e., raising the subfield frequency of the RGB field, color breaking can be reduced. For example, increasing the subfield by a factor of ten reduces the amount of color breaking (color breakup amount) to one tenth.

In Patent Document 2, a single-panel DLP (Digital Light Processing) projector is disclosed in which the subfield frequency is raised to reduce color breaking. "DLP" is a registered trademark.

A DLP projector has: a semiconductor laser, a phosphor wheel that is provided with a phosphor region, a scanning body that scans the phosphor region with a laser light from the semiconductor laser, a micromirror element such as a DMD that modulates the fluorescent light supplied from the phosphor region to form an image, and a projection lens that projects this image.

The micromirror element is driven by a pulse-width modulation (PWM) method and is capable of 256-(8-bit) gradation display. According to PWM 8-bit gradation display, one image (one field) is made up of eight binary images (subfields). In each subfield, weighting of each subfield can be implemented (i.e., luminance is varied) by the temporal length of the interval that a mirror is ON (lighted up), or by the number of pulses of lighting in this interval. Each subfield has a weighting (luminance) of "1," "2," "3," "4," "8," "16," "32," "64," and "128" according to the binary system. The micromirror element displays half-tones by means of the combinations of subfields that are lighted.

The phosphor region is divided into 72 parts in the circumferential direction, red phosphor regions, green phosphor regions, and blue phosphor regions being sequentially arranged in the divided regions. The red phosphor regions contain a phosphor that emits red fluorescent light upon excitation by laser light. The green phosphor regions contain a phosphor that emits green fluorescent light upon excitation by laser light. The blue phosphor regions contain a phosphor that emits blue fluorescent light upon excitation by laser light.

When the phosphor wheel is caused to rotate at 7200 revolutions/minute and the phosphor regions are scanned by laser light, red fluorescent light, green fluorescent light, and blue fluorescent light are sequentially emitted from the phosphor wheel. In this case, the frequency of repetition of the red, green, and blue fluorescent light (subfield frequency) is 2880 Hz and is equivalent to forty-eight times the speed of a case in which the frequency of repetition of color at double speed is set to 60 Hz. At this multiple of speed, color breaking can be reduced.

LITERATURE OF THE PRIOR ART

Patent Documents

Patent Document 1: Japanese Unexamined Patent Application Publication No. 2003-102030
Patent Document 2: Japanese Unexamined Patent Application Publication No. 2010-224493

Non-Patent Document

Non-Patent Document 1: Commentary: "Digital Micromirror Display" Journal of the Vacuum Society of Japan Vol. 43, No. 2, 2000

DISCLOSURE OF INVENTION

As described hereinabove, the problem of color breaking occurs in a field sequential color image display device such as the projector described in Patent Document 1.

Although the projector described in Patent Document 2 is capable of reducing color breaking when the subfield frequency of RGB fields is raised, this projector still has the problems described hereinbelow.

When a DMD is driven by PWM, in order to, for example, display at least the three colors RGB in one field and implement 8-bit gradation display, the least significant bit (LSB) cannot be expressed unless the response speed of mirrors is faster than 21.7 μs (=16.7 ms/3/256). For example, as described on p. 32 of Non-Patent Document 1, if the response speed of the DMD is 15 μs, the least significant bit (LSB) can be expressed at this response speed.

However, in order to reduce color breaking in the projector disclosed in Patent Document 2, not only is the subfield frequency of the RGB fields raised, but the required DMD response speed is also made faster than 15 μs. As a result, the least significant bit (LSB) in some cases cannot be expressed, and the problem arises in which the number of gradations decreases or that gradations cannot be displayed.

It is an object of the present invention to provide an image display device and image display method that allow implementation of high-quality gradation display even when the field frequency is raised to reduce color breaking.

In order to achieve the above-described object, according to one aspect of the present invention, an image display device is provided that includes:

a light source unit that sequentially supplies light of a plurality of colors;

image formation means that is provided with a pixel region composed of a plurality of pixels, the light of the plurality of colors supplied from the light source unit being sequentially irradiated into the pixel region, and images of a plurality of colors being sequentially formed by the modulation of the incident light by each pixel; and control means that controls the image-forming operation of the image formation means; wherein the control means causes formation of images of at least one color of the images of the plurality of colors with pixel combinations formed by a plurality of pixels as pixel units and individually controls the ON state and OFF state of each pixel of the pixel combinations.

According to another aspect of the present invention, an image display method is provided that is the image display method performed by an image display device that is provided with a pixel region composed of a plurality of pixels, light of a plurality of colors being irradiated into the pixel region, and images of a plurality of colors being sequentially formed by the modulation of incident light by each pixel; the method including:

forming images of at least one color among the images of a plurality of colors with pixel combinations formed by a plurality of pixels as the pixel units, and individually controlling the ON state and OFF state of each pixel of the pixel combinations.

BRIEF DESCRIPTION OF THE DRAWINGS

FIG. 1 is a schematic view showing the block construction of the optical system of the image display device according to the first example embodiment of the present invention.

FIG. 2 is a block diagram showing the configuration of the processing/control portion of the image display device according to the first example embodiment of the present invention.

FIG. 3A is a schematic view showing an example of an image that is formed by a DMD panel.

[FIG. 4] FIG. 3B is a schematic view showing an example of an image formed by a DMD panel with pixel combinations composed of four pixels in two rows and two columns as the pixel units.

FIG. 4 is a schematic view showing an example of the luminance levels that can be achieved by pixel combinations.

FIG. 5 is a timing chart showing the operation of each mirror of a pixel combination when the luminance is 50%.

FIG. 6 is a view for describing an example of the modulation operation when the luminance control of pixel combinations composed of four pixels in two rows and two columns is combined with PWM modulation control that implements 8-bit gradation display.

FIG. 7 is a view for describing subfield intervals necessary for half-tone display of 8-bit gradation display.

FIG. 8 is a view for describing each of the subfield intervals of green, red, and blue in one frame interval.

FIG. 9 is a schematic view that shows the block construction of the optical system of the image display device according to the second example embodiment of the present invention.

FIG. 10A is a schematic view showing an example of a phosphor wheel.

FIG. 10B is a schematic view showing an example of a color wheel.

FIG. 11 is a block diagram showing the configuration of the processing/control portion of the image display device according to the second example embodiment of the present invention.

FIG. 12 is a view for describing the change over time of colored light that is irradiated upon two DMD panels.

FIG. 13A is a schematic view showing the image formation region that forms a portion of the image on the basis of one image signal.

FIG. 13B is a schematic view showing the image formation region that forms a portion of an image on the basis of another image signal.

FIG. 14 is a view for describing the operation of the image display device according to the third example embodiment of the present invention.

DESCRIPTION OF EXAMPLE EMBODIMENTS

Example embodiments of the present invention are next described with reference to the accompanying drawings.

First Example Embodiment

FIG. 1 is a schematic view showing the block construction of the optical system of the image display device according to the first example embodiment of the present invention.

Referring to FIG. 1, the image display device is a single-panel DLP projector and includes: light source unit 11, condensing lens 102, light tunnel 103, lens systems 104-106, reflecting mirror 107, TIR (Total Internal Reflection) prism 108, DMD panel 109, and projection lens 110.

Light source unit 11 includes dichroic mirrors 11a and 11b and light sources 11R, 11G, and 11B. Each of light sources 11R, 11G, and 11B includes a solid-state light source such as a laser diode (LD) or a light-emitting diode (LED) and a collimator lens for converting the output light of the solid-state light source to parallel luminous flux. Light source 11R supplies red light, light source 11G supplies green light, and light source 11B supplies blue light. Light source 11R is arranged to face light source 11B. Light sources 11R, 11G, and 11B may be lighted continuously, or may be lighted individually.

The green light beam from light source 11G intersects at approximately 90° with each of the red light beam from light source 11R and the blue light beam from light source 11B. Dichroic mirrors 11a and 11b are provided at the position at which the green light beam intersects the red light beam and blue light beam. Dichroic mirror 11a has the spectral reflectance characteristics of reflecting light of the red wavelength band and transmitting light of the green wavelength band and light of the blue wavelength band. Dichroic mirror 11b has the spectral reflectance characteristics of reflecting light of the blue wavelength band and transmitting light of the red wavelength band and light of the green wavelength band.

The red light supplied from light source 11R is incident to one surface of dichroic mirror 11a at an angle of incidence of approximately 45°, the green light supplied from light source 11G and the blue light supplied from light source 11B are each incident to the other surface of dichroic mirror 11a at an angle of incidence of approximately 45°. Further, the blue light supplied from light source 11B is incident to one surface of dichroic mirror 11b at an angle of incidence of approximately 45°, and the red light supplied from light source 11R and the green light supplied from light source 11G are each incident to the other surface of dichroic mirror 11b at an angle of incidence of approximately 45°. Here, the angle of incidence is the angle formed by an incident light ray and the normal from the point of incidence.

Condensing lens 102 is arranged between light source unit 11 and light tunnel 103 and converges light from light source unit 11 and irradiates the light into light tunnel 103. In FIG. 1, condensing lens 102 is made up of one lens, but this component is not limited to this form. Condensing lens 102 may also be made up of a plurality of lenses.

Light tunnel 103 is a light-homogenizing element, one end surface being the incident surface and the other end surface being the emission surface. Red light that is supplied from light source 11R is reflected by dichroic mirror 11a, and this reflected light is incident to the incident surface of light tunnel 103 by way of condensing lens 102. The blue light supplied from light source 11B is reflected by dichroic mirror 11b, and this reflected light is incident to the incident surface of light tunnel 103 by way of condensing lens 102. The green light supplied from light source 11G is transmitted by dichroic mirrors 11a and 11b and is incident to the incident surface of light tunnel 103 by way of condensing lens 102. Light tunnel 103 may also be made up of a hollow mirror or a solid glass rod. An integrator optical system that uses a fly-eye lens may also be used in place of light tunnel 103.

TIR prism 108 is a total-reflection prism assembly that is provided with total-reflection surface in its interior and contains two triangular prisms. One triangular prism is a right-angle prism and has first and second surfaces that make up the sides that form a right angle and a third surface that forms the hypotenuse. The other triangular prism has first to third surfaces that make up each segment of a triangle. The third surface of the right-angle prism is arranged to face the first surface of the other triangular prism. The first surface of the right-angle prism is the incident surface of TIR prism 108, and DMD panel 109 is arranged to face the second surface of the right-angle prism. The second surface of the other triangular prism is the emission surface of TIR prism 108 and is parallel to the second surface of the right-angle prism. Projection lens 110 is arranged on the emission surface side.

Light emitted from the emission surface of light tunnel 103 is incident to the incident surface of TIR prism 108 by way of lens systems 104-106 and reflecting mirror 107. The light that is irradiated into TIR prism 108 undergoes total reflection at the internal total-reflection surfaces, and is emitted from the second surface of the right-angle prism. The light that is emitted from this second surface is irradiated upon DMD panel 109.

Light tunnel 103 is a component for homogenizing the illuminance distribution on a cross section of the luminous flux irradiated upon DMD panel 109. Rectangular illumination information in which the illuminance distribution is uniform is formed in the vicinity of the emission end of light tunnel 103. This rectangular illumination information forms an image on DMD panel 109 by lens systems 104-106. The shape specifications (such as curvature and material) and number of lenses of lens systems 104-106 should be optimized as appropriate.

DMD panel 109 has a pixel region that is made up of a plurality of micromirrors that are arranged in matrix form and that each form pixels. Micromirrors are configured to change their angle in accordance with the drive voltage, the reflection angle differing for a case in which a drive voltage that indicates the ON state is supplied and a case in which a drive voltage that indicates the OFF state is supplied. By the ON/OFF control of each micromirror in accordance with a video signal, the incident luminous flux is spatially modulated to form an image. The image that is formed by DMD panel 109 is enlarged and projected upon a screen (not shown) by projection lens 110 by way of TIR prism 108.

The configuration of the processing/control portion relating to the display operation of the image display device of the present example embodiment is next described.

FIG. 2 is a block diagram showing the configuration of the processing/control portion of the image display device of the present example embodiment.

Referring to FIG. 2, the image display device includes video input unit 1; light source drive unit 5 that drives each of light sources 11R, 11G, and 11B; DMD drive unit 6 that drives DMD panel 109; and control unit 10 that controls the light output operation of the light source and the image-forming operation of DMD panel 109. Control unit 10 includes scalers 2 and 3 and signal format conversion circuit 4.

Video input unit 1 receives a video signal from an outside device and supplies video signal S1 to scaler 2. The outside device is, for example, a personal computer or an image apparatus such as a recorder.

Scalers 2 and 3 are resolution conversion circuits that convert the resolution of video signal S1 to the optimum resolution for display on DMD panel 109. Here, in the interest of convenience, DMD panel 109 has [1920 (horizontal)×1080 (vertical)] micromirrors and is configured to provide, at a maximum, resolution referred to as full HD (High Definition). However, the resolution of DMD panel 109 is not limited to full HD.

Scaler 2 converts the resolution of video signal S1 to the resolution of QHD (Quarter High Definition) that is one-quarter of the resolution (full HD) that is determined by the number of pixels (1920×1080) of DMD panel 109. Scaler 2 supplies RGB signals of resolution (960×540) to scaler 3.

Scaler 3 converts the resolution of each of the RGB signals supplied from scaler 2 to the same resolution as full HD that is the maximum resolution of DMD panel 109. Scaler 3 supplies RGB signals of resolution (1920×1080) to signal format conversion circuit 4.

Light source drive unit 5 drives each of light sources 11R, 11G, and 11B, and DMD drive unit 6 drives DMD panel 109. Signal format conversion circuit 4 both controls the image forming operation of DMD panel 109 by DMD drive unit 6 on the basis of the RGB signals of resolution (1920×1080) and controls the light source drive operation by light source drive unit 5 in synchronization with this image-forming operation. The control of light source drive unit 5 is carried out on the basis of light source control signal S2 and the control of DMD drive unit 6 is carried out on the basis of DMD control signal S3.

In the control of the image-forming operation, signal format conversion circuit 4 causes formation of images on the basis of the RGB signals with, as pixel units, pixel combinations that are formed by a plurality of pixels, for example, pixel combinations formed from four adjacent pixels in two rows and two columns Signal format conversion circuit 4 then performs the ON/OFF control necessary for gradation display with respect to each micromirror that makes up the pixel combinations.

Further, in the control of the light source drive operation, signal format conversion circuit 4 causes lighting of light sources 11R, 11G, and 11B in time divisions in synchronization with the image-forming operation. As a result, images of each of the colors red, green, and blue and having QHD resolution (960×540) are sequentially formed on a pixel region composed of (1920×1080) micromirrors in DMD panel 109.

FIG. 3A gives a schematic representation of an image of maximum resolution that is formed by DMD panel 109, and FIG. 3B gives a schematic representation of an image that is formed by DMD panel 109 when pixel combinations composed of four pixels in two rows and two columns are the pixel units.

As shown in FIG. 3A, DMD panel 109 can form an image of a maximum resolution of 1920 (horizontal)×1080 (vertical). As shown in FIG. 3B, signal format conversion circuit 4 causes formation of an image on DMD panel 109 with pixel combinations formed from four pixels A, B, C, and D in two rows and two columns as pixel units. The resolution of the image in this case is 960 (horizontal)×540 (vertical) and is lower than that of the image shown in FIG. 3A. However, because pixels A, B, C, and D that make up a pixel combination can be individually controlled, the number of gradations of the image is increased compared to the image shown in FIG. 3A.

FIG. 4 gives a schematic representation of the luminance levels that can be achieved by pixel combinations. The pixel combinations are composed of four micromirror that correspond to pixels A, B, C, and D and can achieve the five steps of luminance levels 0%, 25%, 50%, 75%, and 100%. Here, 0% indicates a state in which all four micromirrors are OFF (black display state). 25% indicates a state in which one of the four micromirrors is ON and the remaining three micromirrors are OFF. 50% indicates a state in which two of the four micromirrors are ON and the remaining two micromirrors are OFF. 75% indicates a state in which three of the four micromirrors are ON and the remaining micromirror is OFF. 100% indicates a state in which all four micromirrors are ON.

In FIG. 4, the levels of each luminance of 0%, 25%, 50%, 75%, and 100% are schematically indicated by a pattern showing the ON/OFF states of four micromirrors. In these patterns, the four boxes indicated by broken lines each correspond to micromirrors, "0" indicating OFF and "1" indicating ON.

The state of 25% luminance has four patterns. The first pattern indicates a state in which the upper left mirror, the lower left mirror, the upper right mirror, and the lower right mirror are 1, 0, 0, and 0, respectively. The second pattern indicates a state in which the upper left mirror, the lower left mirror, the upper right mirror, and the lower right mirror are 0, 1, 0, and 0, respectively. The third pattern indicates a state in which the upper left mirror, the lower left mirror, the upper right, and the lower right mirror are 0, 0, 0, and 1, respectively. The fourth pattern indicates a state in which the upper left mirror, the lower left mirror, the upper right mirror, and the lower right mirror are 0, 0, 1, and 0, respectively. A pixel combination of 25% luminance can be provided by using any of these first to fourth patterns.

The state of 50% luminance has six patterns. The first pattern indicates a state in which the upper left mirror, the lower left mirror, the upper right mirror, and the lower right mirror have each been set to 1, 1, 0, and 0, respectively. The second pattern indicates a state in which the upper left mirror, the lower left mirror, the upper right mirror, and the lower right mirror have each been set to 0, 1, 0, and 1, respectively. The third pattern indicates a state in which the upper left mirror, the lower left mirror, the upper right mirror, and the lower right mirror have each been set to 0, 0, 1, and 1, respectively. The fourth pattern indicates a state in which the upper left mirror, the lower left mirror, the upper right mirror, and the lower right mirror have each been set to 1, 0, 1, and 0, respectively. The fifth pattern indicates a state in which the upper left mirror, the lower left mirror, the upper right mirror, and the lower right mirror have each been set to 1, 0, 0, and 1, respectively. The sixth pattern indicates a state in which the upper left mirror, the lower left mirror, the upper right mirror, and the lower right mirror have each been set to 0, 1, 1, and 0, respectively. A pixel combination of 50% luminance can be provided by using any of these first to sixth patterns.

The state of 75% luminance has four patterns. The first pattern indicates a state in which the upper left mirror, the lower left mirror, the upper right mirror, and the lower right mirror have each been set to 0, 1, 1, and 1, respectively. The second pattern indicates a state in which the upper left mirror, the lower left mirror, the upper right mirror, and the lower right mirror have each been set to 1, 0, 1, and 1, respectively. The third pattern indicates a state in which the upper left mirror, the lower left mirror, the upper right mirror, and the lower right mirror have each been set to 1, 1, 1, and 0, respectively. The fourth pattern indicates a state in which the upper left mirror, the lower left mirror, the upper right mirror, and the lower right mirror have each been set to 1, 1, 0, and 1, respectively. A pixel combination of 75% luminance can be provided by using any of these first to fourth patterns.

As one example, FIG. 5 shows the operation of each mirror of a pixel combination when the luminance is set to 50%. In this example, the pixel combination is made up of four pixels (micromirrors) A, B, C, and D in two rows and two columns. Drive voltage that indicates the ON state is supplied to pixels A and B, and drive voltage that indicates the OFF state is supplied to pixels C and D. The drive of this example corresponds to the drive based on the first pattern of 50% luminance shown in FIG. 4.

In the image display device of the present example embodiment, signal format conversion circuit 4 executes a process (pixel combination luminance control) of changing the luminance of the pixel combination by individually controlling each pixel of the pixel combination and executes a process (PWM modulation control) of implementing gradation display by driving each pixel of a pixel combination by PWM.

In PWM modulation control, a field that is the time unit of displaying images of one frame is made up of a plurality of subfields each provided with time widths that correspond to each of a plurality of bits, and signal format conversion circuit 4 generates a modulation signal that prescribes a plurality of gradations by the combination of these subfields. The modulation signal is generated on the basis of RGB signals (bit signals) from scaler 3. For example, when forming the image (blue image) shown in FIG. 3B based on the B signal (bit signal), signal format conversion circuit 4 generates a modulation signal that prescribes the luminance value of the pixel combination by the subfields provided with the time widths that correspond to that luminance value. Signal format conversion circuit 4 then implements ON/OFF control of each pixel of the pixel combination on the basis of the modulation signal. For example, eight-bit gradation display (256 gradations) can thus be implemented by prescribing gradations by the length of the time widths of pulses and implementing the weighting in subfields on the basis of binary numbers.

By combining PWM modulation control with pixel combination luminance control, the number of gradations can be further increased. For example, combining luminance control of pixel combinations that are composed of four pixels in two rows and two columns with PWM modulation control that carries out 8-bit gradation display enables gradation display of 11 bits or more. In this way, sufficient gradation display quality can be maintained even when the field frequency is raised to suppress color breaking.

FIG. 6 shows an example of a modulation operation when luminance control of pixel combinations made up of four pixels in two rows and two columns is combined with PWM modulation control that performs 8-bit gradation display. The frame frequency is 60 Hz and a one-frame interval is 16.67 ms. When images of each of the colors red, green, and blue are sequentially displayed to obtain a color image, the assigned interval (subfield) of the image of each color is 5.56 ms. In FIG. 6, the upper portion (a) shows the modulation signal (modulation pattern) that indicates the drive timing of the pixel combination, and the lower portion (b) shows the luminance of the pixel combination. In portion (a) and portion (b) of FIG. 6, the horizontal axis shows time. In portion (b) of FIG. 6, the vertical axis shows the luminance (%) of the pixel combination.

In portion (a) of FIG. 6, the modulation signal (modulation pattern) is provided with eight subfields that make up the eight bits from (0) to (7) according to the binary system. These subfields are given time widths having weightings (luminance) of "1," "2," "4," "8," "16," "32," "64," and "128," respectively.

Each pixel combination of DMD panel 109 displays half-tones by combining subfields based on the modulation signal. For example, the luminance that corresponds to "173" is obtained by setting to the ON state the micromirrors in the subfield having a weighting of "128," the subfield having a weighting of "32," the subfield having a weighting of "8," the subfield having a weighting of "4," and the subfield having a weighting of "1."

In portion (b) of FIG. 6, the luminance of the pixel combinations can represent the five stages of 100%, 75%, 50%, 25%, and 0%. In this example, the least significant bits (bits having a weighting of "1") of the modulation signal are set to four, and three of these are set to correspond to 75%, 50% and 25% luminance.

Signal format conversion circuit 4 drives each micromirror of each pixel combination of DMD panel 109 on the basis of a modulation signal that prescribes the pulse widths shown in portion (a) of FIG. 6. At the same time, signal format conversion circuit 4 determines, for the least significant bits of the modulation signal, the micromirrors that are to be driven according to the luminance of the pixel combination shown in portion (b) of FIG. 6. For example, in the case of 50% luminance, signal format conversion circuit 4 sets, for the least significant bits of the modulation signal, the micromirrors corresponding to pixels A and B to the ON state and sets the micromirrors corresponding to pixels C and D to the OFF state as shown in FIG. 5. In this way, gradation expression of altogether 11 bits, i.e., 2048 gradations, can be realized.

However, raising the red, green, and blue subfield frequency is effective for decreasing color breaking. Nevertheless, when the subfield frequency is raised in an image display device that does not employ pixel combinations, the problems arise in which the number of gradations decreases or that gradation display becomes impossible when the subfield intervals become shorter than the intervals determined by the response speed of the micromirrors. In other words, any increase of the subfield frequency is constrained by the response speed of the micromirrors.

According to the modulation operation shown in FIG. 6, varying the luminance of pixel combinations for the four least significant bits has the effect of a three-bit gradation increase. In this case, the subfield interval necessary for half-tone display of eight-bit gradation display (256 gradations) is 0.74 ms, as shown in FIG. 7. Accordingly, the subfield frequency can be raised to 1350 Hz for the original subfield frequency 180 Hz (5.56 ms (=16.67 ms÷3)) and color breaking can be suppressed with superior gradation display.

In this way, the image display device of the present example embodiment is able to form an image with pixel combinations as the pixel units, and moreover, by individually controlling each pixel of the pixel combinations, is able to mitigate the constraint based on the response speed of the micromirrors when the subfield frequency is to be increased. As a result, the subfield frequency can be raised, color breaking can be largely decreased, and moreover, the quality of gradation display can be maintained or improved.

Still further, although the drive control of DMD panel 109 was performed with pixel combinations as pixel units for images of each of the colors red, green, and blue in the present example embodiment, the present invention is not limited to this form. For example, it is sufficient if drive control that uses pixel combinations can be performed for the images of at least one color among the images of each of the colors red, green, and blue.

When solid-state light sources such as LEDs are used as light sources 11R, 11G, and 11B, the luminance of light source 11B is typically higher than that of the other light sources 11R and 11G. As a result, the subfield intervals T1, T2, and T3 for green, red, and blue in one frame interval T are normally set to satisfy the condition T1>T2>T3, as shown in FIG. 8. In this case, the constraint resulting from the response speed of the micromirrors when the subfield frequency relating to blue images is increased is more stringent than the constraints relating to the red or green images. The condition of the subfield intervals T1, T2, and T3 may also be T2>T1>T3.

Still further, when drive control is carried out using pixel combinations, the gradation display can be improved, but the resolution conversely decreases. Due to the visibility characteristics of the human eye, the human eye is insensitive to blue and has difficulty perceiving any decrease of resolution with respect to blue.

Taking into consideration the stringency of the above-described constraints and this insensitivity to any decrease in the resolution of blue, drive control that uses pixel combinations is preferably carried out only for blue images. In this case, signal format conversion circuit 4 causes formation on DMD panel 109 of images of resolution (1920×1080) during display intervals of red images and green images and causes formation on DMD panel 109 of images with pixel combinations formed from a plurality of pixels as pixel units in the display intervals of blue images. For example, when pixel combinations are formed from four pixels in two rows and two columns, signal format conversion circuit 4 causes formation on DMD panel 109 of blue images having QHD resolution (960×540). Signal format conversion circuit 4 then implements ON/OFF control required for gradation display for each micromirror that makes up pixel combinations, whereby resolution can be guaranteed for green and red images and any decrease of resolution can be reduced when observing color images.

In the present example embodiment, moreover, the luminance that can be achieved by pixel combinations composed of four pixels in two rows and two columns was prescribed by the five states of 0%, 25%, 50%, 75%, and 100%, but the luminance is not necessarily limited to these five states. For example, the luminance that can be achieved by pixel combinations may also be prescribed by the combinations of three or more states among the five states. For example, the luminance that can be achieved by pixel combinations may be prescribed by the three states of 0%, 50%, and 100%, or by the three states of 0%, 75%, and 100%. In this case, the subfield interval necessary for representing 256 gradations becomes longer than 0.74 ms, but the effects are maintained of raising the subfield frequency to largely decrease color breaking, and moreover, maintaining or improving the quality of gradation display.

In addition, although resolution conversion was carried out by scalers 2 and 3 in the present example embodiment, signal format conversion circuit 4 may also be provided with a resolution conversion capability similar to scalers 2 and 3. In this case, when a video signal of resolution identical to the maximum resolution of DMD panel 109 is supplied from an outside device to signal format conversion circuit 4, signal format conversion circuit 4 may form on DMD panel 109 images with pixel combinations formed from a plurality of pixels as the pixel units without resolution conversion.

Second Example Embodiment

FIG. 9 is a schematic view showing the block construction of the optical system of an image display device according to the second example embodiment of the present invention.

Referring to FIG. 9, the image display device is a two-panel projector and includes: light source unit 200; light tunnel 209; lens systems 210, 211, and 213; reflecting mirror 212; TIR prism 214; dichroic prism 215; DMD panels 217 and 218; and projection lens 219.

Light source unit 200 includes: laser light sources 21 and 22; lens systems 201a, 201b, 202a, and 202b; dichroic mirrors 203 and 206; condensing lenses 204 and 207; phosphor wheel 205; and color wheel 208.

Each of laser light sources 21 and 22 is made up of a plurality of blue semiconductor lasers. Increasing the number of blue semiconductor lasers increases the light output intensity of light sources 21 and 22.

The light beam diameter of blue light supplied from light source 21 is converted to parallel luminous flux by lens systems 201a and 202a. The blue light that has passed through lens systems 201a and 202a is incident to dichroic mirror 203 at an angle of incidence of approximately 45°. Dichroic mirror 203 has the spectral reflectance characteristics of reflecting, of the visible wavelength band, light of the blue wavelength band and transmitting light of other wavelength bands.

Dichroic mirror 203 reflects blue light that is irradiated from light source 21 by way of lens systems 201a and 202a. The blue reflected light from dichroic mirror 203 is condensed on phosphor wheel 205 by condensing lens 204.

FIG. 10A gives a schematic representation of phosphor wheel 205. As shown in FIG. 10A, phosphor wheel 205 includes yellow phosphor region 803 that contains a phosphor that, when excited by excitation light (for example, blue light), emits yellow fluorescent light. Yellow phosphor region 803 is formed in the circumferential direction and has an overall ring shape.

Blue light that is condensed by condensing lens 204 is irradiated upon yellow phosphor region 803 while phosphor wheel 205 is caused to rotate at a predetermined speed. The yellow fluorescent light that is emitted from yellow phosphor region 803 is irradiated upon dichroic mirror 203 by way of condensing lens 204. The yellow fluorescent light contains a green component (green spectrum) and a red component (red spectrum). The yellow fluorescent light is transmitted through dichroic mirror 203.

The light beam diameter of the blue light supplied from light source 22 is converted by lens systems 201b and 202b to parallel luminous flux. The luminous flux of blue light that has passed through lens systems 201b and 202b intersects the light beam of yellow fluorescent light that has been transmitted through dichroic mirror 203, and dichroic mirror 206 is arranged at this point of intersection.

The yellow fluorescent light that has been transmitted through dichroic mirror 203 is incident to one surface of dichroic mirror 206 at an angle of incidence of approximately 45°. Blue light that has been transmitted through lens systems 201b and 202b is incident to the other surface of dichroic mirror 206 at an angle of incidence of approximately 45°. Dichroic mirror 206, similar to dichroic mirror 203, has the spectral reflectance characteristics of reflecting, of visible wavelength band, light of the blue wavelength band and transmitting light of other wavelength bands.

Yellow fluorescent light that has been transmitted through dichroic mirror 203 is transmitted through dichroic mirror 206. Blue light that is transmitted through lens systems 201b and 202b is reflected by dichroic mirror 206. Yellow fluorescent light that has been transmitted through dichroic mirror 206 and blue light that has been reflected by dichroic mirror 206 are incident to condensing lens 207 on substantially the same optical path.

Light tunnel 209 is a component similar to light tunnel 103 that was shown in FIG. 1, one end surface being the incident surface and the other end surface being the emission surface. Condensing lens 207 condenses yellow fluorescent light and blue light upon the incident surface of light tunnel 209.

Color wheel 208 is arranged in the vicinity of the incident surface of light tunnel 209. FIG. 10B gives a schematic representation of an example of color wheel 208. As shown in FIG. 10B, color wheel 208 is divided into two in the circumferential direction, wavelength-selective film Y being formed on one divided region 801, and wavelength-selective film M being formed on the other divided region 802.

Wavelength-selective film Y has the spectral transmission characteristics of transmitting light of the red wavelength band and light of the green wavelength band and of reflecting or absorbing light of other wavelength bands. Wavelength-selective film M has the spectral transmission characteristics of transmitting light of the red wavelength band and light of the blue wavelength band and of reflecting or absorbing light of other wavelength bands. These wavelength-selective films Y and M can be configured from, for example, dielectric multi-layer films.

Luminous flux (blue light and yellow fluorescent light) from condensing lens 207 is sequentially irradiated upon divided regions 801 and 802 of color wheel 208 while color wheel 208 is caused to rotate at a predetermined speed. Red light and green light (RG light) that are transmitted through wavelength-selective film Y and red and blue light (RB light) that are transmitted through wavelength-selective film M are emitted from color wheel 208 in time divisions. Further, the number of divided regions 801 and 802 and wavelength-selective films Y and M and the width of each wavelength-selective film in the circumferential direction can be set as appropriate.

The light that is emitted from the emission surface of light tunnel 209 is irradiated upon the incident surface of TIR prism 214 by way of lens systems 210, 211, and 213 and reflecting mirror 212. TIR prism 214 is a component similar to TIR prism 108 shown in FIG. 1, and the light that is incident from the incident surface undergoes total reflection in the interior of TIR prism 214 to be emitted from the second surface of the right-angle prism. This light that is emitted from the second surface is incident to dichroic prism 215.

Dichroic prism 215 is made up of first and second prisms, and dichroic film 216 that is provided with the characteristics of reflecting light of the red wavelength band and transmitting light of the green wavelength band and light of the blue wavelength band is formed at the junction interface of these prisms. The first prism is a triangular prism and has first to third surfaces, each forming a line segment of a triangle. The second prism is a polyhedral prism and has first to fourth surfaces that are arranged such that the first surface faces the second surface and the third surface faces the fourth surface.

The first surface of the first prism is arranged to face the second surface of the right-angle prism of TIR prism 214. The second surface of the first prism is joined to the first surface of the second prism, and dichroic film 216 is formed at the junction interface.

Light (red light, green light, and blue light) that is incident from the first surface of the first prism is incident to dichroic film 216. The red light that is reflected by dichroic film 216 undergoes total reflection at the first surface of the first prism and is then emitted from the third surface of the first prism. The red light that is emitted from this third surface is irradiated upon DMD panel 218.

DMD panel 218 forms a red image. The red image light from DMD panel 218 is incident to the third surface of the first prism, reflected by dichroic film 216, and emitted from the first surface of the first prism. The red image light that is emitted from this first surface is transmitted through TIR prism 214 and incident to projection lens 219.

The light (green light and blue light) that is transmitted through dichroic film 216 is emitted from the second surface of the second prism. The light (green light and blue light) that is emitted from this second surface is irradiated upon DMD panel 217.

DMD panel 217 sequentially forms green images and blue images. In other words, green images and blue images are formed in time divisions in DMD panel 217. The green and blue image light from DMD panel 217 is incident from the second surface of the second prism, transmitted through dichroic film 216, and emitted from the first surface of the first prism. The green and blue image light that is emitted from this first surface is transmitted through TIR prism 214 and irradiated upon projection lens 219.

Projection lens 219 enlarges and projects green and blue images that are formed in time divisions on DMD panel 217 and red images that are formed on DMD panel 218.

In the present example embodiment, the light quantity of each of the colors red, green, and blue per unit time can be increased compared to the first example embodiment and a color image of high luminance can therefore be provided.

A diffuser may also be arranged between lens 202b and dichroic mirror 206. In this way, the speckle of laser light can be mitigated, with the result that the image quality of the projected image can be improved.

The configuration of the processing/control portion relating to the display operation of the image display device of the present example embodiment is next described.

FIG. 11 is a block diagram showing the configuration of the processing/control portion of the image display device of the present example embodiment.

Referring to FIG. 11, the image display device includes: control unit 30, video input unit 31, color wheel drive unit 36, and DMD drive units 37 and 38. Control unit 30 includes scalers 32, 33, and 34 and signal format conversion circuit 35.

Video input unit 31 is the same as video input unit 1 that was shown in FIG. 1, receives a video signal from an outside device, and supplies video signal S1 to each of scalers 32 and 34. The outside device is, for example, a personal computer or a video apparatus such as a recorder.

Scalers 32, 33, and 34 are resolution conversion circuits that convert the resolution of video signal S1 to the optimum resolution for display on DMD panels 217 and 218. Here, in the interest of convenience, DMD panels 217 and 218 both have [1920 (horizontal)×1080 (vertical)] micromirrors and are configured to enable the provision of, at a maximum, resolution referred to as full HD (High Definition). However, the resolution of these DMD panels 217 and 218 is not limited to full HD.

Scaler 32 converts the resolution of video signal S1 to QHD (Quarter High Definition) resolution that is one-quarter of the resolution (full HD) that is determined by the number of pixels (1920×1080) of DMD panel 217. Scaler 32 supplies a B signal of resolution (960×540) to scaler 33.

Scaler 33 converts the resolution of the B signal that is supplied from scaler 32 to the same resolution as full HD that is the maximum resolution of DMD panel 217. Scaler 33 supplies the B signal of resolution (1920×1080) to signal format conversion circuit 35.

Scaler 34 converts the resolution of video signal S1 to the same resolution as the full HD that is the maximum resolution of DMD panels 217 and 218 and supplies RG signals of resolution (1920×1080) to signal format conversion circuit 35.

Color wheel drive unit 36 causes color wheel 208 to rotate in accordance with the rotation control signal S10 from signal format conversion circuit 35 and supplies rotation rate detection signal S11 that indicates the rotation rate to signal format conversion circuit 35. DMD drive unit 37 drives DMD panel 217 in accordance with DMD control signal S13 from signal format conversion circuit 35. DMD drive unit 38 drives DMD panel 218 in accordance with DMD control signal S14 from signal format conversion circuit 35.

Signal format conversion circuit 35 both controls the image-forming operation by DMD drive units 37 and 38 on the basis of the B signal supplied from scaler 33 and the RG signals supplied from scaler 34 and controls the color wheel rotation operation by color wheel drive unit 36 in synchronization with this image-forming operation.

In the control of the image-forming operation, signal format conversion circuit 35 both causes sequential formation on DMD panel 217 of blue images based on the B signal and green images based on the G signal and causes formation on DMD panel 218 of red images based on the R signal.

FIG. 12 shows the change over time of the colored light that is irradiated upon DMD panels 217 and 218. Red light is always irradiated upon DMD panel 218. On the other hand, green light and blue light are alternately irradiated upon DMD panel 217. The irradiation interval (subfield interval) of blue light is shorter than the irradiation interval (subfield interval) of green light.

Signal format conversion circuit 35 constantly causes formation on DMD panel 218 of red images based on the R signal. Signal format conversion circuit 35 further detects the irradiation intervals (subfield intervals) of blue light based on rotation rate detection signal S11. Signal format conversion circuit 35 then causes formation on DMD panel 217 of blue images based on the B signal in the irradiation intervals of blue light, and causes formation on DMD panel 217 of green images based on the G signal in the other intervals (irradiation intervals of green light).

With relation to blue images, signal format conversion circuit 35 causes formation of images with pixel combinations formed by a plurality of pixels, for example, pixel combinations each formed from four adjacent pixels in two rows and two columns, as the pixel units. In this way, blue images are formed on DMD panel 217 with, as pixel units, pixel combinations formed by four pixels A, B, C, and D in two rows and two columns as shown in FIG. 3B. Signal format conversion circuit 35 then performs ON/OFF control that is necessary for gradation display upon each micromirror that makes up pixel combinations. In other words, signal format conversion circuit 35 carries out control in which the luminance control of pixel combinations is combined with PWM modulation control. This control is as described in the first example embodiment.

With relation to the green images, on the other hand, signal format conversion circuit 35 causes formation on DMD panel 217 of images of 1920 (horizontal)×1080 (vertical) resolution such as shown in FIG. 3A. Relating to the red images, signal format conversion circuit 35 similarly causes formation on DMD panel 218 of images of 1920 (horizontal)×1080 (vertical) resolution.

In the present example embodiment, color breaking occurs because green images and blue images are formed in time divisions on DMD panel 217. Raising the green and blue subfield frequency is effective for reducing this color breaking. However, increasing the subfield frequency is subject to the constraints based on the response speed of micromirrors as described in the first example embodiment.

According to the image display device of the present example embodiment, with relation to the blue images, forming images with pixel combinations as pixel units, and moreover, individually controlling each pixel of the pixel combinations can mitigate the constraints that are based on the response speed of micromirrors when green and blue subfield frequencies are increased. As a result, the subfield frequency can be increased to largely decrease color breaking, and moreover, the quality of gradation display can also be maintained or improved.

In addition, although the resolution of blue images is reduced, red images and green images can be formed at the maximum resolution of the DMD panel, and color images composed of blue images, red images, and green images are observed as high-definition images with superior tonality.

The modifications described in the first example embodiment can also be applied in the present example as well.

Third Example Embodiment

The image display device of the third example embodiment is of the same configuration as the image display device of the first example embodiment, but the portion of the image-forming control by signal format conversion circuit 4 differs from the first example embodiment.

When images are formed on DMD panel 109 with pixel combinations composed of a plurality of pixels as pixel units in the present example embodiment, signal format conversion circuit 4 switches the combination patterns of ON-state pixels and OFF-state pixels of pixel combinations in a one-field interval. More specifically, signal format conversion circuit 4 switches the combinations of ON-state pixels and OFF-state pixels of pixel combinations within a one-field interval such that the proportion of ON-state pixels and OFF-state pixels does not change.

For example, when pixel combinations are made up of four pixels A, B, C, and D in two rows and two columns, signal format conversion circuit 4 holds in advance data showing the patterns of each luminance shown in FIG. 4. When the luminance of a pixel combination is to be 25%, signal format conversion circuit 4 uses two or more patterns among the first to fourth patterns that indicate 25% luminance to switch combinations. When the luminance of a pixel combination is to be 50%, signal format conversion circuit 4 uses two or more patterns among the first to sixth patterns that indicate 50% luminance to switch combinations. When the luminance of a pixel combination is to be 75%, signal format conversion circuit 4 uses two or more of the patterns among the first to fourth patterns that indicate 75% luminance to switch combinations. The switching of combination patterns can be applied to each of red images, green images, and blue images.

FIG. 14 shows an example of the switching of combination patterns relating to a blue image. In this example, the pixel combinations are made up of four pixels A, B, C, and D in two rows and two columns, and signal format conversion circuit 4 uses the first to fourth patterns that indicate 25% luminance to switch combinations for the blue image within a one-field interval. One field is composed of n subfields $SF_n$. Here, n is assumed to be a multiple of 4 but is not limited to this value.

In the interval of subfield $SF_1$, signal format conversion circuit 4 sets pixel A to the ON state and each of pixels B, C, and D to the OFF state (the first pattern of 25% luminance shown in FIG. 4). In the interval of subfield $SF_2$, signal format conversion circuit 4 sets pixel B to the ON state and switches each of pixels A, C, and D to the OFF state (the second pattern of 25% luminance shown in FIG. 4). In the interval of subfield $SF_3$, signal format conversion circuit 4 sets pixel C to the ON state and sets each of pixels A, B, and D to the OFF state (the third pattern of 25% luminance shown in FIG. 4). In the interval of subfield $SF_4$, signal format conversion circuit 4 sets pixel D to the ON state and sets each of pixels A, B, and C to the OFF state (the fourth pattern of 25% luminance shown in FIG. 4).

By the switching the combination patterns of the ON-state pixels and OFF-state pixels of a pixel combination within a one-field interval by signal format conversion circuit 4, the bright spot in the pixel combination moves, with the result that the luminance distribution of a pixel combination that is observed in a one-field interval can be made uniform. In this way, for example, an outline or a diagonal line can be depicted as a smooth line. When the combination of pixels is not switched, a portion of the pixels in a pixel combination remain in the OFF state without change for 25%, 50%, and 75% luminance, whereby the depiction of an outline or a diagonal line as a smooth line becomes problematic.

The operation of switching combination patterns can also be carried out for red images and green images as for blue images.

The switching of the combinations of ON-state pixels and OFF-state pixels of pixel combinations described in the present example embodiment can also be applied to the image display device of the second example embodiment.

The image display device of each example embodiment described hereinabove is only an example of the present invention and the configuration and operation can be modified as appropriate.

For example, in the image display device of the first example embodiment, when signal format conversion circuit 4 causes images to be formed on DMD panel 109 with pixel combinations composed of a plurality of pixels as pixel units, signal format conversion circuit 4 causes a frame image to be formed by sequentially forming a plurality of images, and of these images, for two images that are formed in temporal continuity, forms one image at a position that is shifted in a predetermined direction by a distance that is equivalent to the pixel pitch of DMD panel 109 with respect to the other image.

For images of each of the colors red, green, and blue based on RGB signals, signal format conversion circuit 4 divides an image field which is the time unit of displaying the images of one frame into first and second subfields and generates image signals G1 and G2 that each correspond to a respective subfield.

In the first subfield interval, DMD drive unit 6 causes an image to be formed on DMD panel 109 based on image signal G1. In the second subfield interval, DMD drive unit 6 causes an image to be formed on DMD panel 109 based on image signal G2.

FIG. 13A shows image formation region 701 in which a portion of image A is formed that is based on image signal G1, and FIG. 13B shows image formation region 702 in which a portion of image B is formed that is based on image signal G2. These images A and B are both formed with pixel combinations made up of four pixels in two rows and two columns as pixel units.

As shown in FIGS. 13A and 13B, image formation region 702 is shifted by a one-pixel portion in each of the vertical direction (column direction) and horizontal direction (row direction) with respect to image formation region 701. In other words, image formation region 702 is shifted in a right downward oblique direction with respect to image formation region 701. Here, the right downward direction is equivalent to a diagonal direction of the pixel combination.

According to the above-described pixel-shifting control, for each of the red, green, and blue images, image A that is based on image signal G1 and image B that is based on image signal G2 are displayed in time divisions on the projection surface. Due to the afterimage phenomenon of the human eye, image A and image B are observed as superposed images.

By shifting the image formation region shared by images A and B by a one-pixel portion in each of the vertical direction and horizontal direction as shown in FIG. 13A and FIG. 13B, images A and B become an image in which mutually corresponding pixels (i.e., pixel combinations) are shifted by 0.5 pixel in each of the vertical direction and horizontal direction on the projection surface. In this case, the superposed images of image A and image B are observed as an image having a number of pixels corresponding to the number of pixels of DMD panel 109. This enables a reduction in the decrease of the resolution of an image that occurs in cases in which the image is displayed with pixel combinations as pixel units.

In this modification, images that are formed in time divisions should be images formed with pixel combination composed of n (rows)×m (columns) pixels as unit pixels. Here, "n" and "m" are positive integers (where the case in which n=1 and moreover m=1 is excluded). In this case, various forms of pixel combinations can be achieved such as 1×2, 2×1, 2×2, and 3×3.

For example, when first and second images are formed in time divisions with pixel combinations composed of two pixels of one row and two columns as unit pixels, the image formation region shared between the first and second images is shifted in the column direction by one pixel. In this case, the observed image is an image in which the number of pixel is doubled in the column direction.

When first and second images are formed in time divisions with pixel combinations made up of two pixels in two rows and one column as unit pixels, the image formation region shared between the first and second images is shifted in the row direction by one pixel. In this case, the observed image is an image in which the number of pixels is doubled in the row direction.

When images are formed in time divisions with pixel combinations made up of nine pixels in three rows and three columns as unit pixels, first to third image signals that each show first to third images are generated. One frame is further divided into first to third subframes (or subfields). A first image is then formed based on a first image signal in the interval of the first subframe, a second image is formed based on a second image signal in the interval of the second subframe, and a third image based on a third image signal is formed in the interval of the third subframe. In this case, the image formation region shared between the first and second images is shifted by one pixel in each of the row direction and column direction. Further, the image formation region shared between the second and third images is shifted by one pixel in each of the row direction and column direction. In this way, a high-definition image can be provided in which the number of pixels of the observed image is increased compared to a case of constituting pixel combinations from four pixels in two rows and two columns.

The pixel-shifting control of this modification can also be applied to the image display devices of the second and third example embodiments. In these cases, the pixel-shifting control is carried out for blue images.

Although DMD panels were used as the image formation means in the example embodiments and modifications described hereinabove, the present invention is not limited to these forms. A liquid crystal panel can also be used as the image formation means.

Further, the present invention is not limited to a projector. The present invention can also be applied to a direct-view monitor such as a MEMS (Micro Electro Mechanical System) device.

The present invention incorporates by citation all the disclosures of International Patent Application No. PCT/JP2014/052863 for which application was submitted internationally on Feb. 7, 2014.

The present invention can also adopt the forms as shown in the following SUPPLEMENTARY NOTES 1-16 but is not limited to these forms.

[Supplementary Note 1]

An image display device includes:

a light source unit that sequentially supplies light of a plurality of colors;

image formation means that is provided with a pixel region composed of a plurality of pixels, the light of the plurality of colors supplied from the light source unit being sequentially irradiated into the pixel region, and images of a plurality of colors being sequentially formed by the modulation of the incident light by each pixel; and control means that controls the image-forming operation of the image formation means;

wherein the control means causes formation of an image of at least one color of the images of the plurality of colors with pixel combinations formed by a plurality of pixels as pixel units, and individually controls the ON state and OFF state of each pixel of the pixel combinations.

[Supplementary Note 2]

In the image display device as described in SUPPLEMENTARY NOTE 1, the control means switches the ON state and OFF state of each pixel that makes up the pixel combinations on the basis of a video signal that is supplied as input and controls ON-state pixels by pulse width modulation.

[Supplementary Note 3]

In the image display device as described in SUPPLEMENTARY NOTE 2, a field that is the time unit of displaying images of one frame is made up of a plurality of subfields provided with time widths that each correspond to a plurality of bits; and the control means both carries out the pulse width modulation according to a modulation signal that is based on the plurality of bits and switches the ON state and OFF state of each pixel of the pixel combinations in at least the intervals of the smallest bits of the modulation signal to control the luminance of the pixel combinations.

[Supplementary Note 4]

In the image display device as described in any one of SUPPLEMENTARY NOTES 1 to 3, the control means switches the combination of ON-state pixels and OFF-state pixels of the pixel combinations within field intervals that are the time units of displaying the images of one frame such that the proportion of ON-state pixels and OFF-state pixels does not change.

[Supplementary Note 5]

In the image display device as described in any one of SUPPLEMENTARY NOTES 1 to 4, the control means, for images of said at least one of the colors, causes sequential formation of a plurality of images with the pixel combinations as pixel units to form frame images, and, for two images formed in temporal continuity of the plurality of images, causes formation of one image at a position shifted in a predetermined direction and by a distance that is equivalent to the pixel pitch of the pixel region with respect to the other image.

[Supplementary Note 6]

In the image display device as described in SUPPLEMENTARY NOTE 5, the pixel combinations are made up of four pixels in two rows and two columns and the predetermined directions are the row direction and the column direction.

[Supplementary Note 7]

In the image display device as described in any one of SUPPLEMENTARY NOTES 1 to 5:

the images of the plurality of colors include red images, green images, and blue images; and the control means causes formation of at least the blue images with the pixel combinations as the pixel units.

[Supplementary Note 8]

The image display device as described in SUPPLEMENTARY NOTE 7 further includes a projection lens; and the light source unit includes a red solid-state light source that supplies red light, a green solid-state light source that supplies green light, and a blue solid-state light source that supplies blue light;

the image formation means includes a DMD panel that is sequentially irradiated by the red light that is supplied from the red solid-state light source, the green light that is supplied from the green solid-state light source, and the blue light that is supplied from the blue solid-state light source and sequentially forms the red images, green images, and blue images; and the projection lens projects the red images, green images, and blue images that were sequentially formed by the DMD panel.

[Supplementary Note 9]

The image display device as described in SUPPLEMENTARY NOTE 7 further includes a projection lens and an illumination optical system; and the image formation means includes first and second DMD panels;

the light source unit separates light in which blue light is combined with yellow fluorescent light that contains light of the green wavelength band and light of the red wavelength band into first-color light that contains light of the red wavelength band and light of the green wavelength band and second-color light that contains light of the red wavelength band and light of the blue wavelength band and alternately supplies the first- and second-color light;

the illumination optical system is irradiated by the first and second color light, irradiates the first DMD panel with light of the red wavelength band that is contained in the irradiated light and alternately irradiates the second DMD panel with light of the green wavelength band and light of the blue wavelength band contained in the irradiated light;

the first DMD panel modulates the light of the red wavelength band to form the red images;

the second DMD panel modulates the light of the green wavelength band to form the green images and modulates light of the blue wavelength band to form the blue images; and the projection lens both projects the red images that are formed by the first DMD panel and projects the green images and blue images that are sequentially formed by the second DMD panel.

[Supplementary Note 10]

An image display method is carried out in an image display device that is provided with a pixel region made up of a plurality of pixels, light of a plurality of colors being sequentially irradiated into the pixel region, and images of a plurality of colors being sequentially formed by the modulation of incident light by each pixel; and the image display method includes: forming images of at least one color among the images of a plurality of colors with pixel combinations formed by a plurality of pixels as the pixel units, and individually controlling the ON state and OFF state of each pixel of the pixel combinations.

[Supplementary Note 11]

The image display method as described in SUPPLEMENTARY NOTE 10 further includes:

switching the ON state and OFF state of each pixel that makes up the pixel combinations on the basis of a video signal that is received as input; and controlling ON-state pixels by pulse width modulation.

[Supplementary Note 12]

In the image display method as described in SUPPLEMENTARY NOTE 11:

a field that is the time unit of displaying images of one frame is made up of a plurality of subfields provided with time widths that correspond to a plurality of bits; and the image display method further includes: both carrying out the pulse width modulation according to a modulation signal that is based on the plurality of bits and controlling the luminance of the pixel combinations by switching the ON state and OFF state of each pixel of the pixel combinations at least in the intervals of the smallest bits of the modulation signal.

[Supplementary Note 13]

The image display method as described in any one of SUPPLEMENTARY NOTES 10 to 12 further includes:

in the field intervals that are the time units of displaying the image of one frame, switching the combinations of ON-state pixels and OFF-state pixels of the pixel combinations such that the proportion of ON-state pixels and OFF-state pixels does not change.

[Supplementary Note 14]

The image display method as described in any one of SUPPLEMENTARY NOTES 10 to 13 further includes:

for images of at least one of the colors, causing formation of frame images by sequentially forming a plurality of images with the pixel combinations as pixel units, and for two images that are formed in temporal continuity of the plurality of images, forming one image shifted in a predetermined direction by a distance equivalent to the pixel pitch of the pixel region with respect to the other image.

[Supplementary Note 15]

In the image display method as described in SUPPLEMENTARY NOTE 14, the pixel combinations are made up of four pixels in two rows and two columns, and the predetermined directions are the row direction and the column direction.

[Supplementary Note 16]

In the image display method as described in any one of SUPPLEMENTARY NOTES 10 to 15, images of the plurality of colors include red images, green images, and blue images, and the images of at least one of the colors are blue images.

EXPLANATION OF REFERENCE NUMBERS 1 video input unit
2, 3 scaler
4 signal format conversion circuit
5 light source drive unit
6 DMD drive unit
10 control unit
11 light source unit
11a, 11b dichroic mirror
11R, 11G, 11B light source
102 condensing lens
103 light tunnel
104-106 lens system
107 reflecting mirror
108 TIR prism
109 DMD panel
110 projection lens

What is claimed is:

1. An image display device comprising:
a light source unit that sequentially supplies light of a plurality of colors;
an image formation unit that is provided with a pixel region including a plurality of pixels, the light of said plurality of colors supplied from said light source unit being sequentially irradiated into said pixel region, and images of a plurality of colors being sequentially formed by modulation of incident light by each said pixel; and
a controller that controls the image-forming operation of said image formation unit;
wherein said controller causes formation of images of at least one color of the images of said plurality of colors with pixel combinations formed by a plurality of pixels as pixel units, and individually controls an ON state and OFF state of each pixel of said pixel combinations,
wherein said controller switches a combination of ON-state pixels and OFF-state pixels of said pixel combinations within a field interval that is a time unit of displaying the images of one frame such that a proportion of ON-state pixels and OFF-state pixels does not change.

2. The image display device as set forth in claim 1, wherein said controller switches the ON state and OFF state of each pixel that makes up said pixel combinations on the basis of a video signal that is supplied as input and controls ON-state pixels by pulse width modulation.

3. The image display device as set forth in claim 2, wherein a field that is the time unit of displaying images of one frame includes a plurality of subfields provided with time widths that each correspond to a plurality of bits; and said controller both carries out said pulse width modulation according to a modulation signal that is based on said plurality of bits and switches the ON state and OFF state of each pixel of said pixel combinations in at least the intervals of the smallest bits of said modulation signal to control a luminance of said pixel combinations.

4. The image display device as set forth in claim 1, wherein said controller, for images of said at least one of the colors, causes sequential formation of a plurality of images with said pixel combinations as pixel units to form frame images, and, for two images formed in temporal continuity of said plurality of images, causes formation of one image at a position shifted in a predetermined direction and by a distance that is equivalent to the pixel pitch of said pixel region with respect to the other image.

5. The image display device as set forth in claim 4, wherein said pixel combinations include four pixels in two rows and two columns and said predetermined directions include the row direction and the column direction.

6. The image display device as set forth in claim 1, wherein:
images of said plurality of colors include red images, green images, and blue images; and
said controller causes formation of at least said blue images with said pixel combinations as the pixel units.

7. The image display device as set forth in claim 6, further comprising a projection lens; wherein:

said light source unit has a red solid-state light source that supplies red light, a green solid-state light source that supplies green light, and a blue solid-state light source that supplies blue light;

said image formation unit includes a digital mirror device (DMD) panel that is sequentially irradiated by said red light that is supplied from said red solid-state light source, said green light that is supplied from said green solid-state light source, and said blue light that is supplied from said blue solid-state light source and sequentially forms said red images, green images, and blue images; and said projection lens projects said red images, green images, and blue images that were sequentially formed by said DMD panel.

8. The image display device as set forth in claim 6, further comprising a projection lens and an illumination optical system; wherein:

said image formation unit includes first and second digital mirror device (DMD) panels;

said light source unit separates light in which blue light is combined with yellow fluorescent light that contains light of a green wavelength band and light of a red wavelength band into first-color light that contains light of said red wavelength band and light of said green wavelength band and second-color light that contains light of said red wavelength band and light of a blue wavelength band and alternately supplies the first- and second-color light;

the lumination optical system is irradiated by said first- and second-color light, irradiates said first DMD panel with light of said red wavelength band that is contained in the irradiated light and alternately irradiates said second DMD panel with light of said green wavelength band and light of said blue wavelength band contained in the irradiated light;

said first DMD panel modulates the light of said red wavelength band to form said red images;

said second DMD panel modulates the light of said green wavelength band to form said green images and modulates light of said blue wavelength band to form said blue images; and said projection lens both projects said red images that are formed by said first DMD panel and projects said green images and blue images that are sequentially formed by said second DMD panel.

9. An image display method that is carried out in an image display device that is provided with a pixel including a plurality of pixels, light of a plurality of colors being sequentially irradiated into said pixel region, and images of a plurality of colors being sequentially formed by modulation of incident light by each pixel; said image display method comprising:

forming images of at least one color among the images of said plurality of colors with pixel combinations formed by a plurality of pixels as the pixel units;

individually controlling an ON state and OFF state of each pixel of said pixel combinations; and in the field intervals that are time units of displaying the image of one frame, switching combinations of ON-state pixels and OFF-state pixels of the pixel combinations such that a proportion of ON-state pixels and OFF-state pixels does not change.

10. The image display method according to claim 9, further comprising:

switching the ON state and OFF state of each pixel that makes up the pixel combinations on the basis of a video signal that is received as input; and controlling ON-state pixels by pulse width modulation.

11. The image display method according to claim 9, wherein a field that is the time unit of displaying images of one frame includes plurality of subfields provided with time widths that correspond to a plurality of bits; and the image display method further comprising: both carrying out the pulse width modulation according to a modulation signal that is based on the plurality of bits and controlling a luminance of the pixel combinations by switching the ON state and OFF state of each pixel of the pixel combinations at least in intervals of the smallest bits of the modulation signal.

12. The image display method according to claim 9, further comprising:

for images of at least one of the colors, causing formation of frame images by sequentially forming a plurality of images with the pixel combinations as pixel units; and for two images that are formed in temporal continuity of the plurality of images, forming one image shifted in a predetermined direction by a distance equivalent to the pixel pitch of the pixel region with respect to the other image.

13. The image display method according to claim 9, wherein the pixel combinations include four pixels in two rows and two columns, and the predetermined directions include the row direction and the column direction.

14. The image display method according to claim 9, wherein images of the plurality of colors include red images, green images, and blue images, and the images of at least one of the colors are blue images.

15. An image display device comprising:

a light source unit that sequentially supplies light of a plurality of colors;

an image formation unit that is provided with a pixel region including a plurality of pixels, the light of said plurality of colors supplied from said light source unit being sequentially irradiated into said pixel region, and images of a plurality of colors being sequentially formed by modulation of incident light by each said pixel; and a controller that controls the image-forming operation of said image formation unit;

wherein said controller causes formation of images of at least one color of the images of said plurality of colors with pixel combinations formed by a plurality of pixels as pixel units, and individually controls an ON state and OFF state of each pixel of said pixel combinations, wherein said controller, for images of said at least one of the colors, causes sequential formation of a plurality of images with said pixel combinations as pixel units to form frame images, and, for two images formed in temporal continuity of said plurality of images, causes formation of one image at a position shifted in a predetermined direction and by a distance that is equivalent to the pixel pitch of said pixel region with respect to the other image.

16. An image display device comprising:

a projection lens;

an illumination optical system;

a light source unit that sequentially supplies light of a plurality of colors;

an image formation unit that is provided with a pixel region including a plurality of pixels, the light of said plurality of colors supplied from said light source unit being sequentially irradiated into said pixel region, and images of a plurality of colors being sequentially formed by modulation of incident light by each said pixel; and a controller that controls the image-forming operation of said image formation unit, wherein said controller causes formation of images of at least one color of the images of said plurality of colors with pixel combinations formed by a plurality of pixels as pixel units, and individually controls an ON state and OFF state of each pixel of said pixel combinations, wherein images of said plurality of colors include red images, green images, and blue images and said controller causes formation of at least said blue images with said pixel combinations as the pixel units, wherein:

said image formation unit includes first and second digital mirror device (DMD) panels;

said light source unit separates light in which blue light is combined with yellow fluorescent light that contains light of the green wavelength band and light of the red wavelength band into first-color light that contains light of said red wavelength band and light of said green wavelength band and second-color light that contains light of said red wavelength band and light of the blue wavelength band and alternately supplies the first- and second-color light;

the illumination optical system is irradiated by said first- and second-color light, irradiates said first DMD panel with light of said red wavelength band that is contained in the irradiated light and alternately irradiates said second DMD panel with light of said green wavelength band and light of said blue wavelength band contained in the irradiated light;

said first DMD panel modulates the light of said red wavelength band to form said red images;

said second DMD panel modulates the light of said green wavelength band to form said green images and modulates light of said blue wavelength band to form said blue images; and said projection lens both projects said red images that are formed by said first DMD panel and projects said green images and blue images that are sequentially formed by said second DMD panel.

17. An image display method that is carried out in an image display device that is provided with a pixel region including a plurality of pixels, light of a plurality of colors being sequentially irradiated into said pixel region, and images of a plurality of colors being sequentially formed by modulation of incident light by each pixel; said image display method comprising:

forming images of at least one color among the images of said plurality of colors with pixel combinations formed by a plurality of pixels as the pixel units;

individually controlling an ON state and OFF state of each pixel of said pixel combinations;

for images of at least one of the colors, causing formation of frame images by sequentially forming a plurality of images with the pixel combinations as pixel units; and for two images that are formed in temporal continuity of the plurality of images, forming one image shifted in a predetermined direction by a distance equivalent to the pixel pitch of the pixel region with respect to the other image.

* * * * *